(12) United States Patent
Hunter et al.

(10) Patent No.: US 8,725,833 B2
(45) Date of Patent: May 13, 2014

(54) COMPARISON OF SELECTED ITEM DATA TO USAGE DATA FOR ITEMS ASSOCIATED WITH A USER ACCOUNT

(75) Inventors: James M. Hunter, San Jose, CA (US); Alexei I. Fedosseev, San Jose, CA (US)

(73) Assignee: Motorola Mobility LLC, Chicago, IL (US)

( * ) Notice: Subject to any disclaimer, the term of this patent is extended or adjusted under 35 U.S.C. 154(b) by 346 days.

(21) Appl. No.: 13/295,037

(22) Filed: Nov. 11, 2011

(65) Prior Publication Data
US 2013/0124671 A1    May 16, 2013

(51) Int. Cl.
G06F 15/16 (2006.01)
H04L 29/08 (2006.01)
G06Q 30/06 (2012.01)

(52) U.S. Cl.
CPC ............ *H04L 67/02* (2013.01); *G06Q 30/0643* (2013.01)
USPC ........................................................ 709/217

(58) Field of Classification Search
CPC ..... H04L 67/02; H04L 69/00; G06Q 30/0643
USPC ........................................................ 709/217
See application file for complete search history.

(56) References Cited

U.S. PATENT DOCUMENTS

| 7,334,728 | B2 | 2/2008 | Williams |
| 7,913,909 | B2 | 3/2011 | Iizaka et al. |
| 7,942,337 | B2 | 5/2011 | Jain |
| 8,069,011 | B2 | 11/2011 | Liu et al. |
| 8,215,546 | B2 | 7/2012 | Lin et al. |
| 2002/0032507 | A1 | 3/2002 | Diaz et al. |
| 2006/0099944 | A1 | 5/2006 | Ross et al. |
| 2007/0256118 | A1 | 11/2007 | Nomura et al. |
| 2008/0041957 | A1 | 2/2008 | Kotlarsky et al. |
| 2008/0157932 | A1* | 7/2008 | Winkler ....................... 340/10.6 |
| 2009/0083834 | A1* | 3/2009 | Rubinstein et al. ............... 726/2 |
| 2010/0080383 | A1 | 4/2010 | Vaughan et al. |
| 2011/0219427 | A1 | 9/2011 | Hito et al. |
| 2013/0292460 | A1 | 11/2013 | Hunter |

FOREIGN PATENT DOCUMENTS

| EP | 1045302 B1 | 10/2003 |
| WO | 2009121409 A1 | 10/2009 |
| WO | 2009128173 A1 | 10/2009 |

OTHER PUBLICATIONS

Patent Cooperation Treaty, International Search Report and Written Opinion of the International Searching Authority for International Application No. PCT/US2013/038581, Jul. 12, 2013, 9 pages.
United States Patent and Trademark Office, "Non-Final Rejection" for U.S. Appl. No. 13/463,121 dated Oct. 18, 2013, 6 pages.

\* cited by examiner

*Primary Examiner* — Hee Soo Kim

(57) ABSTRACT

Comparing usage of items at a location associated with a sensor network to attributes of a selected item is disclosed. A client device captures an item descriptor associated with a selected item. An item identifier is extracted from the item descriptor and transmitted from the client device to an item information server to retrieve data describing attributes of the selected item. The client device transmits an account identifier to an account server, which uses the account identifier to retrieve data from a sensor network describing usage of items at a location associated with the sensor network. The account server transmits to the client device a comparison of one or more attributes of the selected device with usage of items at the location associated with the sensor network.

21 Claims, 3 Drawing Sheets

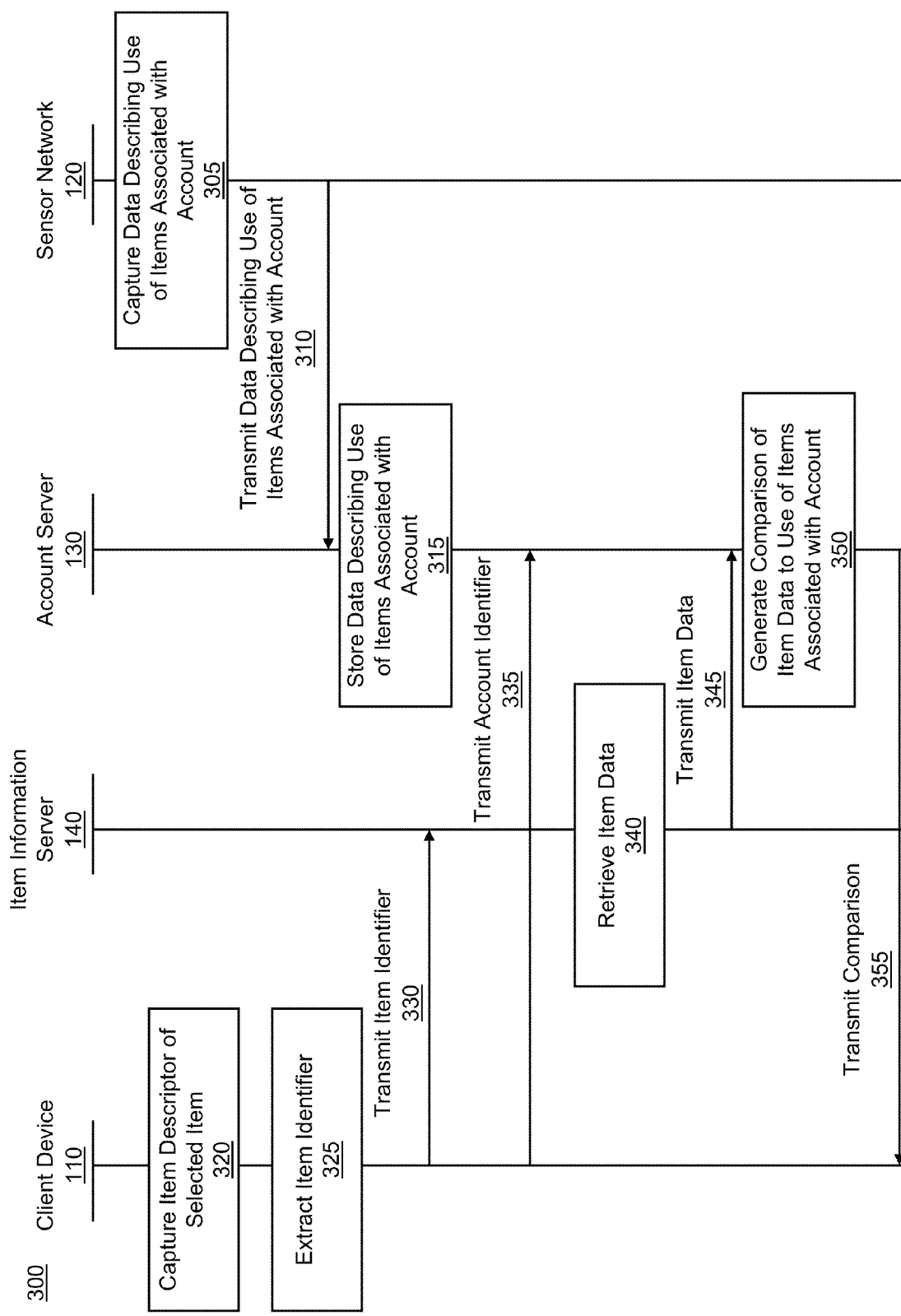

COMPARISON OF SELECTED ITEM DATA TO USAGE DATA FOR ITEMS ASSOCIATED WITH A USER ACCOUNT

FIELD OF THE DISCLOSURE

The present disclosure relates generally to providing data describing item usage, and more specifically to providing data comparing characteristics of a selected item to captured data describing prior usage of items in a location.

BACKGROUND

Providing additional information about an item relative to a purchaser's item usage habits better allows the purchaser to determine whether or not to purchase the item. However, purchasers do not have a simple way to determine how they can benefit from an item based on similar previously-purchased products. Currently, a purchaser must manually determine and record how previously purchased items have performed, requiring significant effort.

While users may be able to retrieve information about an item, the available information is limited to information describing the item itself or pricing of the item. This item-specific information does not account for differences in item usage by different consumers, but typically describes general characteristics of the item based on average usage. For example, available item-specific information may provide information about the item from typical item usage, but a purchaser has an atypical usage pattern for similar items, the item may be more valuable or attractive to the purchaser.

BRIEF DESCRIPTION OF THE DRAWINGS

The accompanying Figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 is an event diagram of a method for comparing usage of items at a location associated with a sensor network to attributes of a selected item in accordance with some embodiments.

Figure 1:
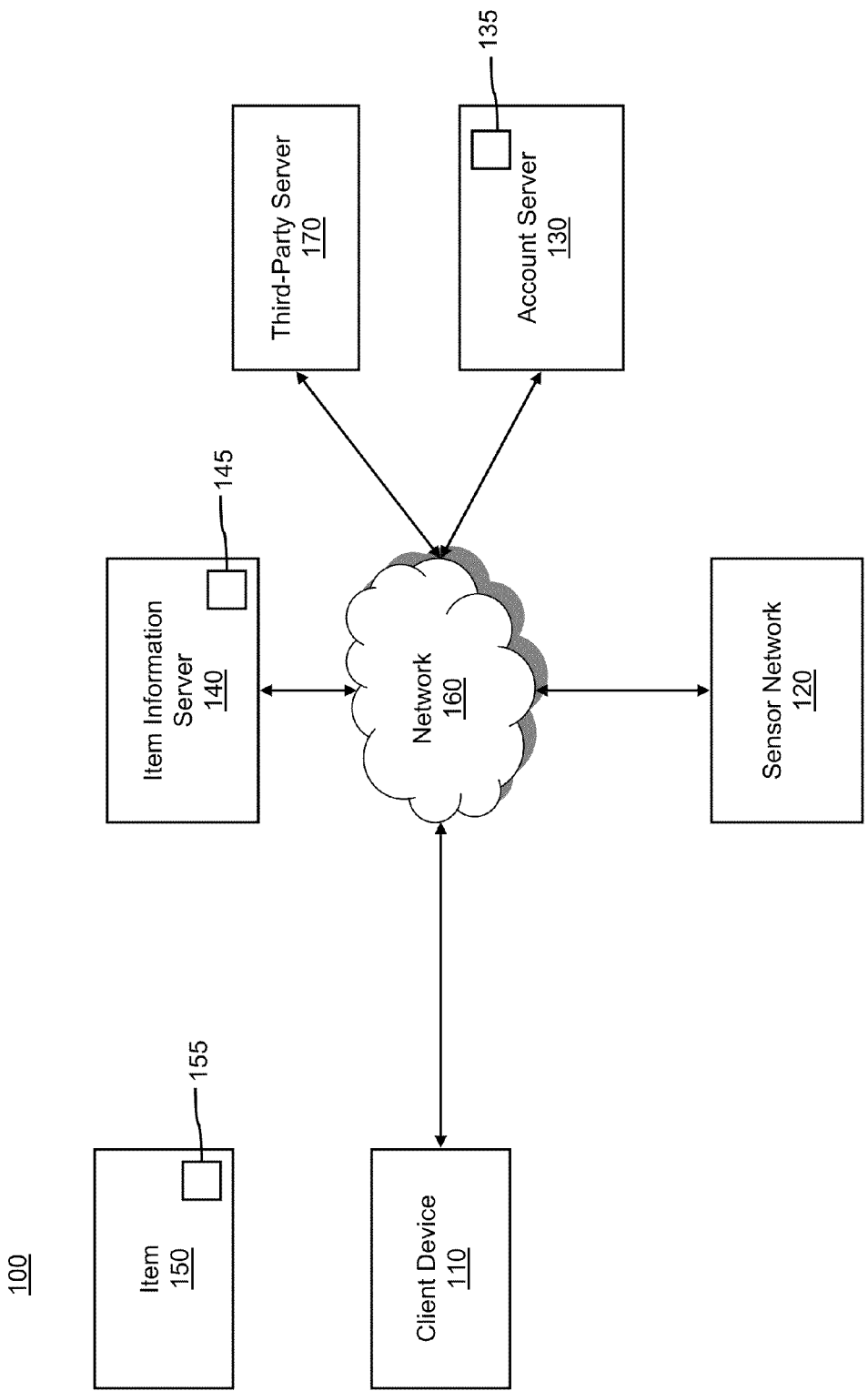
FIG. 1 is a block diagram of a computing system in accordance with some embodiments.

Skilled artisans will appreciate that elements in the Figures are illustrated for simplicity and clarity and have not necessarily been drawn to scale. For example, the dimensions of some of the elements in the Figures may be exaggerated relative to other elements to help to improve understanding of embodiments of the present invention.

The apparatus and method components have been represented where appropriate by conventional symbols in the drawings, showing the specific details that are pertinent to understanding the embodiments of the present invention so as not to obscure the disclosure with details that will be readily apparent to those of ordinary skill in the art having the benefit of the description herein.

DETAILED DESCRIPTION

The following disclosure describes a system and method for comparing usage of items at a location associated with a sensor network to attributes of a selected item. A client device associated with an account captures an item descriptor associated with a selected item and extracts an item identifier from the item descriptor. For example, the client device captures an image of a quick response (QR) code and extracts the item identifier from the QR code. The client device transmits the item identifier to an item information server, which includes data associated with one or more items and retrieves data associated with the selected item using the item identifier. The client device transmits an account identifier to an account server, which retrieves data from a sensor network using the account identifier. The sensor network is associated with a location and with the account and transmits data describing usage of one or more items at the location to the client device for storage. The account server also receives the data associated with the selected item from the item information server and generates a comparison of the data associated with the selected item with the data from the sensor network describing usage of one or more items at the location. The comparison is transmitted from the account server to the client device.

In the following description, for purposes of explanation, numerous specific details are set forth to provide a thorough understanding of the invention. However, it will be apparent to one skilled in the art that the invention can be practiced without these specific details. In other instances, structures and devices are shown in block diagram form in order to avoid obscuring the invention.

System Overview

Figure (FIG. 1 is a block diagram of one embodiment of a computing system 100. In the embodiment shown by FIG. 1, the computing system 100 includes a client device 110, a sensor network 120, an account server 130, an item information server 140, an item 150 and a network 160. In one embodiment, such as the embodiment shown in FIG. 1, the computing system 110 may also include a third-party server 170. However, in different embodiments, the computing system 100 may include different and/or additional components than those depicted in FIG. 1.

The client device 110 is any device with data processing and data communication capabilities. Examples of a client device 110 include a smartphone, a tablet computer, a netbook computer, a laptop computer or any other suitable device. The client device 110 includes an image capture device having optics and sensors for capturing image data. Additionally, the client device 110 is communicatively coupled to one or more of the sensor network 120, the item information server 140 and/or the account server 130 via the network 160. Alternatively, the client device 110 has a direct connection to one or more of the sensor network 120, the item information server 140 and/or the account server 130. The client device 110 is also associated with an account, such as a user account, and includes an account identifier associated with the account. In one embodiment, the client device 110 and the account server 130, further described below, exchange data associated with the account. The client device 110 is further described below in conjunction with FIG. 2.

The sensor network 120 comprises one or more sensors associated with a location and capturing data about one or more items at the location. The sensor network 120 may include different types of sensors coupled to a device for capturing different types of data describing item usage. For example, the sensor network 120 includes a first sensor capturing data describing the frequency with which an item is used, a second sensor capturing power consumption by the item, a third sensor capturing power efficiency of the item, item health and/or additional sensors capturing or calculating any suitable metric of item usage. The sensors in the sensor network 120 may also exchange data with each other. Hence, the sensor network 120 is associated with a location and captures data describing usage of one or more items at the location. For example, the sensor network is associated with a home and includes sensors capturing data describing usage of lighting elements within the home, appliances within the home and electronics within the home, such as frequency of use and power consumption.

In one embodiment, the sensor network 120 also includes a processor determining additional usage information from data captured by the sensors. For example, the processor calculates cost of operating an item from the power consumption and a power cost associated with the location including the sensor network 120, estimates cost of future operation of the item based on frequency of use, power consumption of the item and power cost associated with the location including the sensor network 120. As another example, the processor in the sensor network 120 may allow aggregation of item usage or item resource usage based on one or more item attributes; for example, the processor aggregates usage data based on an area within the location including the sensor network 120 or based on type of item.

The sensor network 120 is associated with an account and communicates data captured by the one or more sensors, along with an account identifier, to the account server 130 via the network 160. This allows the account server 130 to maintain a usage database 135 describing resource usage by and/or usage of items at the location associated with the sensor network 120 associated with the account. In one embodiment, one or more sensors included in the sensor network 120, or a processor included in the sensor network, include an account identifier in a storage device to specify the account associated with the sensor network 120.

The account server 130 is one or more computing devices having data processing and data communication capabilities. The account server 130 is communicatively coupled to the client device 110, the sensor network 120 and the item information server 140 via the network 160. The account server 130 receives data from the sensor network 120 and/or the client device 110 via the network 160 and identifies an account associated with the received data. Additionally, the account server 130 may receive data from the item information server 140 and compare data from the item information server 140 with data associated with an account. For example, the account server 130 compares data form the item information server 140 with data from the sensor network 120 describing resource use by, or usage of, an item at the location associated with the sensor network 120.

The usage database 135 comprises a storage device included in the account server 130 including data associating an account with a client device 110 and with data received from the sensor network 120. For example, the usage database 135 is a database associating an account identifier with a client device identifier and with data from the sensor network 120, allowing data from the sensor network 120 to be retrieved using the account identifier. In other embodiments, the usage database 135 may use any other suitable method to associate a client device 110 and/or data from the sensor network 120 with an account. The usage database 135 may also include additional information associated with an account, such as a description of the location associated with the sensor network 120, a type associated with devices at the location associated with the sensor network 120, aesthetic information or preferences associated with the location associated with the sensor network 120, items previously acquired for the location associated with the sensor network 120 or any other suitable data.

The item information server 140 is one or more computing devices having data processing and data communication capabilities. The item information server 140 is communicatively coupled to the client device 110 and the account server 130 via the network 160. In one embodiment, the item information server 140 is also communicatively coupled to the sensor network 120 via the network 160. The item information server 140 includes data describing one or more items, such as expected power consumption, expected operation cost, average item life expectancy or any other suitable data describing use of an item. In one embodiment, the item information server 140 is included in a location that also includes an item 150; for example, the item information server 140 is included in a store that sells the item 150. Alternatively, the item information server 140 is located remote from the location including the item 150.

The item database 145 comprises a storage device included in the item information server 140 including item identifiers and data associated with the item identifiers. In one embodiment, the item information server 140 retrieves data associated with the received item identifier from the item database 145. For example, the item information server 140 retrieves data describing expected item performance, one or more item attributes and/or an item description from the item database 145 responsive to receiving a device identifier.

In one embodiment, the item information server 140 transmits, using the network 160, the data associated with the received item identifier to a destination device responsive to receiving the item identifier. The destination device may be different than the device from which the item identifier was received. For example, the item information server 140 transmits data associated with an item identifier to the account server 130 responsive to receiving an item identifier from the client device 110.

The item 150 is a device or component suitable for use in the location associated with the sensor network 120. In the embodiment shown in FIG. 1, the item 150 is not associated with the account associated with the client device 110. For example, the item 150 is an electronic component, an appliance, a lighting device, a tool or any other device capable of use in the location associated with the sensor network. In one embodiment, the item 150 is a device or component that consumes power, or another resource.

An item identifier is associated with the item 150. In one embodiment, the item information server 140 stores data describing the item in the item database 145 and associates the data with the item identifier, allowing retrieval of the item data using the item identifier. For example, the item identifier is an alphanumeric string.

An item descriptor 155 is generated from the item identifier and is located proximate to the item 150. In one embodiment, the item descriptor 155 is displayed on, or affixed to, a surface of the item 150, a location where the item 150 is stored or packaging including the item 150. In one embodiment, the item descriptor 155 is a graphical representation of the item identifier displayed proximate to the item 150 or on the item 150.

In one embodiment, the item descriptor 155 is a two-dimensional image generated by applying an encoding process to the item identifier and data identifying the item information server 140. For example, the item descriptor is generated from the item identifier and an address associated with the item information server 140, allowing a client device 110 to identify the item information server 140 from the item descriptor 155. For example, the item descriptor 155 is a quick response (QR) code, or any other suitable image, generated from the item identifier and data identifying the item information server 140. As another example, data comprising the item descriptor 155 may be captured by the client device 110 via near field communication (NFC).

In one embodiment, the item descriptor 155 may include additional information describing the item 150, allowing information describing the item to be obtained from the item descriptor 155. For example, the item descriptor 155 includes, a type associated with the item 150, metadata describing one or more attributes of the item 150 or any other data describing attributes or performance of the item 150.

In some embodiments, the computing system 110 includes a third-party server 170, or multiple third-party servers. The third-party server 170 is communicatively coupled to one or more of the client device 110, the sensor network 120, the account server 130 and/or the item information server 140 via the network 160. In one embodiment, the third party server 170 receives an item identifier from the client device 110 or from the item information server 140 and transmits stored data associated with the item identifier to the client device 110 or to the account server 130 via the network 160. For example, the third-party server 170 transmits data to the client device 110 or to the account server 130 indicating whether a third-party recommends or certifies the item associated with the item identifier or comments by a third-party regarding the item associated with the item identifier. As another example, the third-party server 170 transmits data describing recommended operating environments, settings or use cases for the item associated with the item identifier to the client device 110 or to the account server 130. Hence, the third-party server 170 may augment data from the sensor network 120 and item information server 140 with additional data from a third-party to provide additional data about an item from one or more third-parties.

The network 160 is a conventional type for data, video and/or audio transmission. In various embodiments, the network 160 is a wired network, a wireless network or a combination of wireless and wired networks. The network 160 may have any number of configurations such as a star configuration, a token ring configuration or another configuration known in the art. Furthermore, the network 160 may comprise a local area network (LAN), a wide area network (WAN) (e.g., the Internet), and/or any other interconnected data path across which multiple devices may communicate. In yet another embodiment, the network 160 may be a peer-to-peer network. The network 160 may also be coupled to or include portions of a telecommunications network for sending data in a variety of different communication protocols, such as those used for transmission control protocol/Internet protocol (TCP/IP), satellite link and/or cable television communication. For example, the network 160 may transmit voice data using one or more of a Global System for Mobile (GSM) communication system, Code Division Multiple Access (CDMA) system, Universal Mobile Telecommunications System (UMTS) or any other suitable protocols.

The network 160 may also transmit data using one or more of General Packet Radio Service (GPRS), third-generation (3G), or greater, mobile network, fourth-generation (4G), or greater, mobile network, High Speed Download Packet Access (HSDPA), High Speed Uplink Packet Access (HSUPA), Long-Term Evolution (LTE), Worldwide Interoperability for Microwave Access (WiMax) or any other suitable protocol. In yet another embodiment, the network 160 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email or other types of data known in the art.

Figure 2:
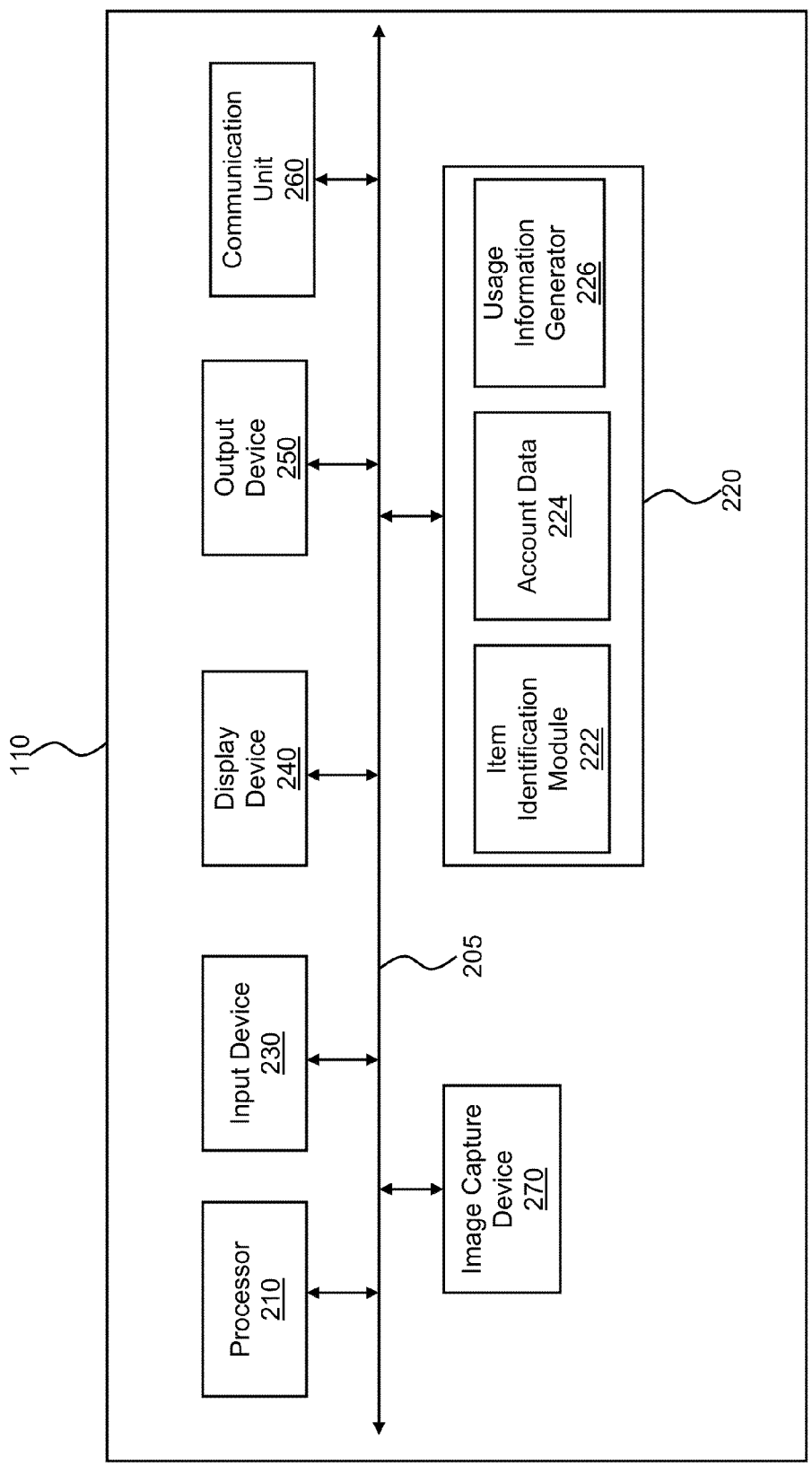
FIG. 2 is a block diagram of a client device in accordance with some embodiments.

FIG. 2 is a block diagram of one embodiment of a client device 110. In the embodiment shown by FIG. 2, the client device 110 includes a processor 210, a storage device 220, an input device 230, a display device 240, an output device 250, a communication unit 260 and an image capture device 270. The components of the client device 110 are coupled together via a bus 205. However, in different embodiments, the client device 110 may include different and/or additional components than those illustrated by FIG. 2.

The processor 210 processes data or instructions and may comprise various computing architectures. For example, the processor 210 may process data or instructions using a complex instruction set computer (CISC) architecture, a reduced instruction set computer (RISC) architecture, an architecture implementing a combination of instruction sets or any other suitable instruction set. Although FIG. 2 shows a single processor 210, in other embodiments, the client device 110 may include multiple processors. The processor 210 transmits, processes and/or retrieves data from the storage device 220, the input device 230, the display device 240, the output device 250, the communication unit 260 and/or the image capture device 270.

The storage device 220 stores data and/or instructions that, when executed by the processor 210, cause the processor 210 to perform one or more actions and/or to provide one or more types of functionality. The data and/or instructions included in the storage device 220 may comprise computer-readable code that, when executed by the processor 210, performs one or more of the methods described herein and/or provides at least a subset of the functionality described herein. The storage device 220 may comprise a dynamic random access memory (DRAM), a static random access memory (SRAM), a hard disk, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), a Flash memory or another memory device known in the art. The storage device 220 may be a persistent storage device, a non-persistent storage device or a combination of a persistent storage device and a non-persistent storage device in various embodiments. The storage device 220 is coupled to the processor 210, the input device 230, the display device 240, the output device 250, the communication unit 260 and/or the image capture device 270 via the bus 205.

In the embodiment shown by FIG. 2, the storage device 220 includes an item identification module 222, account data 224 and a usage information generator 226. In other embodiments, the storage device 220 may include different and/or additional components than those shown in FIG. 2. The item identification module 222 is data that, when executed by the processor 210, extracts an item identifier and/or data identifying an item information server 140 from an item descriptor 155. For example, the item identification module 222 includes instructions describing a process for extracting an alphanumeric string and additional data, such as an item information server address, from a QR code.

The account data 224 is data identifying an account associated with the client device 110. For example, the account data 224 is an alphanumeric account identifier and data, such as a network address or Uniform Resource Indicator (URI), associated with the account server 130. As another example, the account data 224 is login information and data identifying the account server 130, such as a network address or URI. The account data 224, or a subset of the account data 224, is transmitted from the client device 110 to the account server 130 to access data associated with the account that is stored by the account server 130.

The usage information generator 226 is data that, when executed by the processor 210, generates a description of resource usage by, or usage of, items at the location associated with the sensor network 120. In one embodiment, the usage information generator 226 also generates and displays a comparison of resource usage by, or usage of, items at the location associated with the sensor network 120 with data from the item information server 140 describing an item. For example, the usage information generator 226 generates a comparison of current resource usage by an item at the location associated with the sensor network 120 with estimated resource usage by an item associated with an item descriptor 155.

In one embodiment, the client device 110 receives the comparison from the account server 130 via the network 160 and the usage information generator 226 formats the comparison based on one or more preferences or settings. Alternatively, the usage information generator 226 receives data from the account server 130 and the item information server 140 and locally generates the comparison.

The input device 230 is any device configured to receive input and to communicate received input to the processor 210, to the storage device 220 or to another component of the client device 110. For example, the input device 230 comprises a cursor controller, a touch-sensitive display or a keyboard. In one embodiment, the input device 230 includes an alphanumeric input device, such as a keyboard, a key pad, representations of such created on a touch-sensitive display or another device adapted to communicate information and/or commands to the processor 210 or to the storage device 220. In another embodiment, the input device 230 comprises an input device for communicating positional data as well as data or commands to the processor 210 or to the storage device 220 such as a joystick, a mouse, a trackball, a stylus, a touch-sensitive display, directional keys or another suitable input device known in the art.

The display device 240 is a device that displays electronic images and/or data. For example, the display device 240 comprises an organic light emitting diode display (OLED), a liquid crystal display (LCD) or any other device such as a monitor. In one embodiment, the display device 240 includes a touch-sensitive transparent panel for receiving data or allowing other interaction with the images and/or data displayed by the display device 240.

The output device 250 comprises one or more devices that convey data or information to a user of the client device 110. For example, the output device 250 includes one or more speakers or headphones for presenting audio data to a user. As another example, the output device 250 includes one or more light emitting diodes (LEDs) or other light sources to provide visual data to a user. As another example, the output device 250 includes one or more devices for providing vibrational, or haptic, feedback to a user. The above are merely examples and the output device 250 may include one or more devices for providing auditory output, tactile output, visual output, any combination of the preceding or any other suitable form of output.

The communication unit 260 transmits data from the client device 110 to the network 160 for transmission to one or more of the account server 130 and/or the item information server 140. The communication unit 260 also receives data via the network 160 from the account server 130 and/or the item information server 140. In one embodiment, the communication unit 260 includes a near field communication (NFC) transceiver allowing receipt of the item descriptor 155 via NFC from a NFC transmitter, such as a transmitted located proximate to the item 150.

In one embodiment, the communication unit 260 comprises one or more wireless transceivers transmitting and/or receiving data using one or more wireless communication protocols. Example wireless communication protocols include IEEE 802.11a/b/g/n (WiFi), Global System for Mobile (GSM), Code Division Multiple Access (CDMA), Universal Mobile Telecommunications System (UMTS), General Packet Radio Service (GPRS), third-generation (3G), or greater, mobile network, fourth-generation (4G), or greater, mobile network, High Speed Download Packet Access (HSDPA), High Speed Uplink Packet Access (HSUPA), Long-Term Evolution (LTE), Worldwide Interoperability for Microwave Access (WiMax), BLUETOOTH® or another wireless communication protocol. In another embodiment, the communication unit 260 is a network adapter or another type of wired communication port for communicating with the network 160 or with one or more of the sensor network 120, the account server 130 and/or the item information server 140 using a wired communication protocol, such as Universal Serial Bus (USB), Ethernet or another suitable wired communication protocol. In yet another embodiment, the communication unit 260 comprises a combination of one or more transceivers and one or more wired network adapters, or similar wired devices.

The image capture device 270 comprises sufficient optics and/or sensors for capturing image data. For example, the image capture device 270 is a camera or a video recorder. The image capture device 270 transmits captured image data to the processor 210, the storage device 220 and/or one or more additional components of the client device 110 via the bus 205.

Methods

FIG. 3 is an event diagram of a method 300 for comparing usage of items at a location associated with a sensor network 120 to attributes of a selected item in accordance with some embodiments. In the example of FIG. 3, the sensor network 120 is associated with a location and with an account. One or more sensors, or a processor, included in the sensor network 120 include data identifying the account, such as an account identifier. The sensor network 120 captures 305 data describing use of items at the location associated with the sensor network 120. For example, the sensor network 120 captures 305 data describing frequency of use, power consumption and/or additional data of electrical devices within a home or office. The sensor network 120 transmits 310 the data describing resources used by and/or usage of the items to the account server 130 via the network 160. For example, a processor included in the sensor network 120 generates a message including data captured 305 by one or more sensors and the account identifier and transmits 310 the message to the account server 130. In one embodiment, the sensor network 120 may transmit 310 additional data to the account server 130. For example, the sensor network 120 transmits 310 a description or attributes of one or more items at the location associated with the sensor network 120 along with the data describing usage of and/or resources used by the items.

Responsive to receiving the data from the sensor network 120 describing use of and/or resources used by one or more items at the location, the account server 130 stores 315 the data from the sensor network 120 and the account identifier of the account associated with the sensor network 120. In one embodiment, the account server 130 stores the item usage data and/or item resource usage data from the sensor network 120 in the usage database 135 and associates the received account identifier with the stored data. By associating the account identifier with the data received from the sensor network 120, the account server 130 allows data describing use of items in the location associated with the sensor network 120 to be accessed using the account identifier.

Independent of the sensor network 120 capturing 305 and transmitting 310 data describing use of items in a location, the client device 110 captures 320 an item descriptor associated with a selected item and extracts 325 the item identifier from the item descriptor. The selected item is not at the location associated with the sensor network 120, but is at a different location. For example, the selected item is at a store while the sensor network 120 is associated with a home or office. In one embodiment, the client device captures 320 an image of a two-dimensional image generated by applying an encoding process to the item identifier and an address associated with an item information server 140. For example, the client device 110 captures 320 a picture of a QR code located proximate to the selected item using a camera or video recorder. Alternatively, the client device 110 captures 320 the item descriptor using a NFC transceiver included in a communication unit 260.

The client device 110 extracts 325 an item identifier from the captured item descriptor. For example, a processor 210 included in the client device 110 executes instructions stored in a storage device 220 to extract 325 the item identifier associated with the selected item from a captured image, such as a picture of a QR code. As another example, the processor 210 included in the client device 110 executes instructions stored in a storage device 220 to parse data received via NFC to extract 325 the item identifier.

The extracted item identifier is transmitted 330 from the client device 110 to the item information server 140 via the network 160. The client device 110 also retrieves account data 224 and transmits 335 an account identifier the account server 130 via the network 160. For example, the client device 110 retrieves an account identifier and an account server address from account data 224 stored in the storage device 220.

Responsive to receiving the item identifier, the item information server 140 retrieves 340 data associated with the item identifier. For example, the item information server 140 retrieves data from the item database 145 associated with the received item identifier. In one embodiment, the data from the item database 145 describes expected or estimated performance, resource usage, cost of operation or other data associated with the selected item. The item information server 140 transmits 345 the data associated with the item identifier to the account server 130 using the network 160.

Responsive to receiving the account identifier from the client device 110 and the item data from the item information server 140, the account server 130 generates 350 a comparison of the data from the item information server 140 with the stored data from the sensor network 120 describing usage of items at a location associated with the sensor network 120. In one embodiment, the comparison analyzes trends in usage of items at the location associated with the sensor network 120 over time and data describing expected, estimated or measured performance of the selected item to determine whether the expected performance of the selected item would improve or impair performance of items over time at the location associated with the sensor network 120 if used in the location. As another example, the comparison analyzes current resource usage by items at the location associated with the sensor network 120 and data associated with the selected item to indicate how inclusion of the selected item in the location associated with the sensor network 120 would affect resource usage at the location. In another example, the comparison may recommend alternate items based on data describing usage of items at the location associated with the sensor network 120 and an attribute of the selected item.

As an additional example, the comparison summarizes usage of items similar to the selected item at the location associated with the sensor network 120. The account server 130 may identify items at the location associated with the sensor network 120 having one or more attributes similar to attributes of the selected item. Alternatively, the account server 130 may identify items at the location associated with the sensor network 120 having an item identifier matching the item identifier associated with the selected item. This allows the comparison to summarize the resources used by items at the location associated with the sensor network 120 that are similar to the selected item. This identifies advantages or disadvantages of using the selected item, or items similar to the selected item, at the location associated with the sensor network 120.

The account server 130 transmits the comparison to the client device 110 via the network 160, allowing a user of the client device 110 to review and analyze the comparison. In one embodiment, the usage information generator 226 included in the client device 110 formats or modifies the received comparison more easily identify information from the comparison. In an alternative embodiment, the account server 130 transmits a subset of the data describing use of items at the location associated with the sensor network 120 and the item data to the client device 110, where the usage information generator 226 generates the comparison.

In one embodiment, an item descriptor 155 is displayed in a store proximate to an item 150 to allow a user to obtain additional information when considering purchasing the item. For example, the user captures an image of the item descriptor 155 using a client device 110, which extracts an item identifier from the item descriptor 155. The client device 110 transmits the item identifier to an item information server 140 and an account identifier to an account server 130. The account server 130 receives data describing the item 150 from the item information server 140 and uses the account identifier to retrieve information from a sensor network 120 describing use of items at a location. The account server 130 generates a comparison between one or more attributes of the item 150 to the data describing use of items at the location and transmits the comparison to the client device 110. This allows the user to determine how the item 150 would affect the resources used at the location, providing the user with additional information when determining whether to purchase the item 150.

For example, an item descriptor 155 is displayed in a store proximate to light bulbs for sale. The user captures the item descriptor 155 using a client device 110, so the client device 110 transmits an item identifier associated with the light bulbs to an item information server 140 and transmits an account identifier to an account server 130. The item information server 140 retrieves data describing attributes of the light bulbs, such as estimated lifetime, estimated cost of operation, and transmits the retrieved data to the account server 130. Using the account identifier from the client device 110, the account server 130 retrieves data from a sensor network 120 associated with the user's home. The data from the sensor network 120 describes the current usage of light bulbs in the user's home, such as the average lifetime of light bulbs in the user's home, the cost of powering light bulbs in the user's home and the frequency of use of different light bulbs in the user's home. The account server 130 compares the data from the item information server 140 describing attributes of the light bulbs in the store with the data from the sensor network 120 describing usage of light bulbs in the user's home. The comparison is transmitted from the account server 130 to the client device 110, allowing the user to see the usage of different light bulbs in the user's home and an estimate of how the attributes of the light bulbs in the store would affect the light bulb usage data from the user's home. This increases the amount of relevant information available to the user when deciding to purchase the light bulbs by showing the user's current usage of light bulbs as well as how attributes of the light bulbs in the store may affect future light bulb usage in the user's home.

In the foregoing specification, specific embodiments have been described. However, one of ordinary skill in the art appreciates that various modifications and changes can be made without departing from the scope of the invention as set forth in the claims below. Accordingly, the specification and Figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, from a sensor network associated with an account, data describing usage of one or more items at a location associated with the sensor network and an account identifier associated with the account;
   storing, in a storage device, the data describing usage of the one or more items associated with the location associated with the sensor network and the account identifier;
   receiving, from a client device, the account identifier;
   receiving data associated with a selected item, the selected item not at the location associated with the sensor network;
   responsive to receiving the account identifier from the client device,
   retrieving the data describing usage of the one or more items at the location associated with the sensor network;
   generating a comparison of the data associated with the selected item to the data describing usage of one or more items at the location associated with the sensor network; and
   transmitting, to the client device, the comparison of the data associated with the selected item to the data describing usage of one or more items at the location associated with the sensor network.

2. The method of claim 1, wherein the data describing usage of one or more items at the location associated with the sensor network comprises a frequency with which an item is used at the location, power consumption by the item at the location, power efficiency of the item in the location and a heath of the item at the location.

3. The method of claim 1, wherein the data describing usage of one or more items at the location associated with the sensor network comprises a cost of operation of an item in the location, a power cost associated with the location, a power cost associated with a subset of the location, an estimated future cost of operation of the item, an estimated future cost of operation of the location and an estimated future cost of operation of the subset of the location.

4. The method of claim 1, wherein the data describing usage of one or more items at the location associated with the sensor network comprises at least one of an identifier associated with one or more items at the location associated with the sensor network, one or more attributes of an item at the location associated with the sensor network or a description of the item at the location associated with the sensor network.

5. The method of claim 1, wherein generating the comparison of the data associated with the selected item to the data describing usage of one or more items at the location associated with the sensor network comprises:
   determining a trend of item usage at the location associated with the sensor network over time;
   retrieving data describing expected performance of the selected item; and
   determining a difference between expected performance of the selected item and the trend of item usage at the location associated with the sensor network over time.

6. The method of claim 1, wherein generating the comparison of the data associated with the selected item to the data describing usage of one or more items at the location associated with the sensor network comprises:
   determining current use of a resource by one or more items at the location associated with the sensor network;
   comparing data describing expected use of the resource by the selected item with the current use of the resource by one or more items at the location associated with the sensor network; and
   determining a difference between the expected use of the resource by the selected item and the current use of the resource by one or more items at the location associated with the sensor network.

7. The method of claim 1, wherein generating the comparison of the data associated with the selected item to the data describing usage of one or more items at the location associated with the sensor network comprises:
   determining an item at the location associated with the sensor network having similar attributes to the selected item;
   identifying additional items from an item database having similar attributes to the item at the location associated with the sensor network; and
   identifying an alternate item from the additional items.

8. The method of claim 1, wherein generating the comparison of the data associated with the selected item to the data describing usage of one or more items at the location associated with the sensor network comprises:
   determining an item at the location associated with the sensor network having one or more similar attributes to the selected item; and
   summarizing usage of a resource by the item at the location associated with the sensor network.

9. The method of claim 1, wherein generating the comparison of the data associated with the selected item to the data describing usage of one or more items at the location associated with the sensor network comprises:
   determining an item at the location associated with an identifier matching an item identifier associated with the selected item; and
   summarizing usage of a resource by the item at the location associated with the sensor network.

10. A method comprising:
    capturing an item descriptor associated with a selected item;
    extracting an item identifier from the item descriptor;
    transmitting the item identifier to an item information server;
    transmitting an account identifier to an account server; and
    receiving a comparison of data associated with the selected item from the item information server with data captured by a sensor network and associated with a location describing usage of one or more items at the location; and
    displaying the comparison.

11. The method of claim 10, wherein capturing the item descriptor associated with the selected item comprises:
    capturing a graphical image generated from the item identifier and data identifying the item information server.

12. The method of claim 11, wherein the graphical image comprises a quick response (QR) code.

13. The method of claim 11, wherein the graphical image is generated from the item identifier, data describing the item information server, data identifying a type associated with the selected item and metadata describing one or more attributes of the selected item.

14. The method of claim 10, wherein capturing the item descriptor associated with the selected item comprises:
    receiving the item descriptor through near field communication.

15. The method of claim 10, wherein receiving the comparison of data associated with the selected item from the item information server with data captured by the sensor network associated with the location describing usage of one or more items at the location comprises:
    receiving a summary of resource usage by an item at the location associated with the sensor network, the item having one or more attributes similar to the selected item.

16. The method of claim 10, wherein receiving the comparison of data associated with the selected item from the item information server with data captured by the sensor network associated with the location describing usage of one or more items at the location comprises:
    receiving a difference between an expected use of a resource by the selected item and a current use of a resource by one or more items at the location associated with the sensor network.

17. A system comprising:
    a client device associated with an account, the client device configured to capture an item descriptor associated with a selected item and to extract an item identifier from the item descriptor;
    an item information server coupled to the client device, the item information server including data associated with one or more items and configured to receive the item identifier from the client device and to retrieve data associated with the selected item;
    a sensor network associated with a location and with the account, the sensor network capturing data describing usage of one or more items at the location; and
    an account server coupled to the client device, to the item information server and to the sensor network, the account server storing data from the sensor network describing usage of one or more items at the location and the account server configured to receive an account identifier from the client device, to retrieve the data from the sensor network describing usage of one or more items at the location using the account identifier, to receive the data associated with the selected item from the item information server, to generate a comparison of the data associated with the selected item with the data from the sensor network describing usage of one or more items at the location and to transmit the comparison to the client device.

18. The system of claim 17, wherein the item descriptor associated with the selected item comprises a graphical image generated from the item identifier and data identifying the item information server.

19. The system of claim 18, wherein the graphical image comprises a quick response (QR) code.

20. The system of claim 17, wherein the comparison comprises a summary of resource usage by an item at the location having one or more attributes similar to the selected item.

21. The system of claim 17, wherein the comparison comprises a difference between an expected use of a resource by the selected item and a current use of a resource by one or more items at the location.

\* \* \* \* \*